Sept. 17, 1957 G. R. HENRY 2,806,938
ILLUMINATED ROTATING TREE
Filed June 15, 1955 8 Sheets-Sheet 1

INVENTOR
GRADY R. HENRY

BY D. Robert Cervera
ATTORNEY

Sept. 17, 1957             G. R. HENRY            2,806,938
ILLUMINATED ROTATING TREE
Filed June 15, 1955                                      8 Sheets-Sheet 2
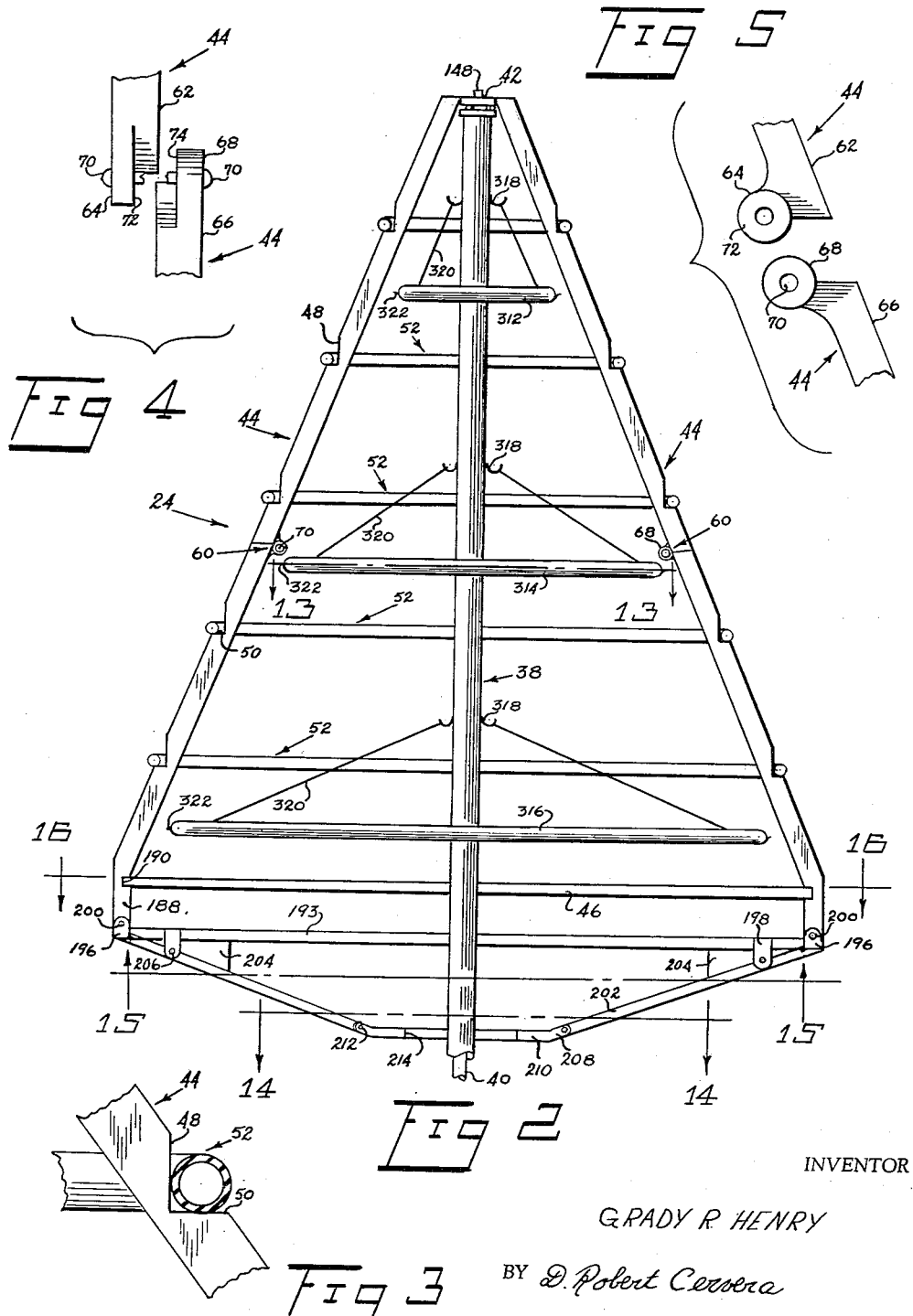
INVENTOR
GRADY R. HENRY
BY D. Robert Cervera
ATTORNEY

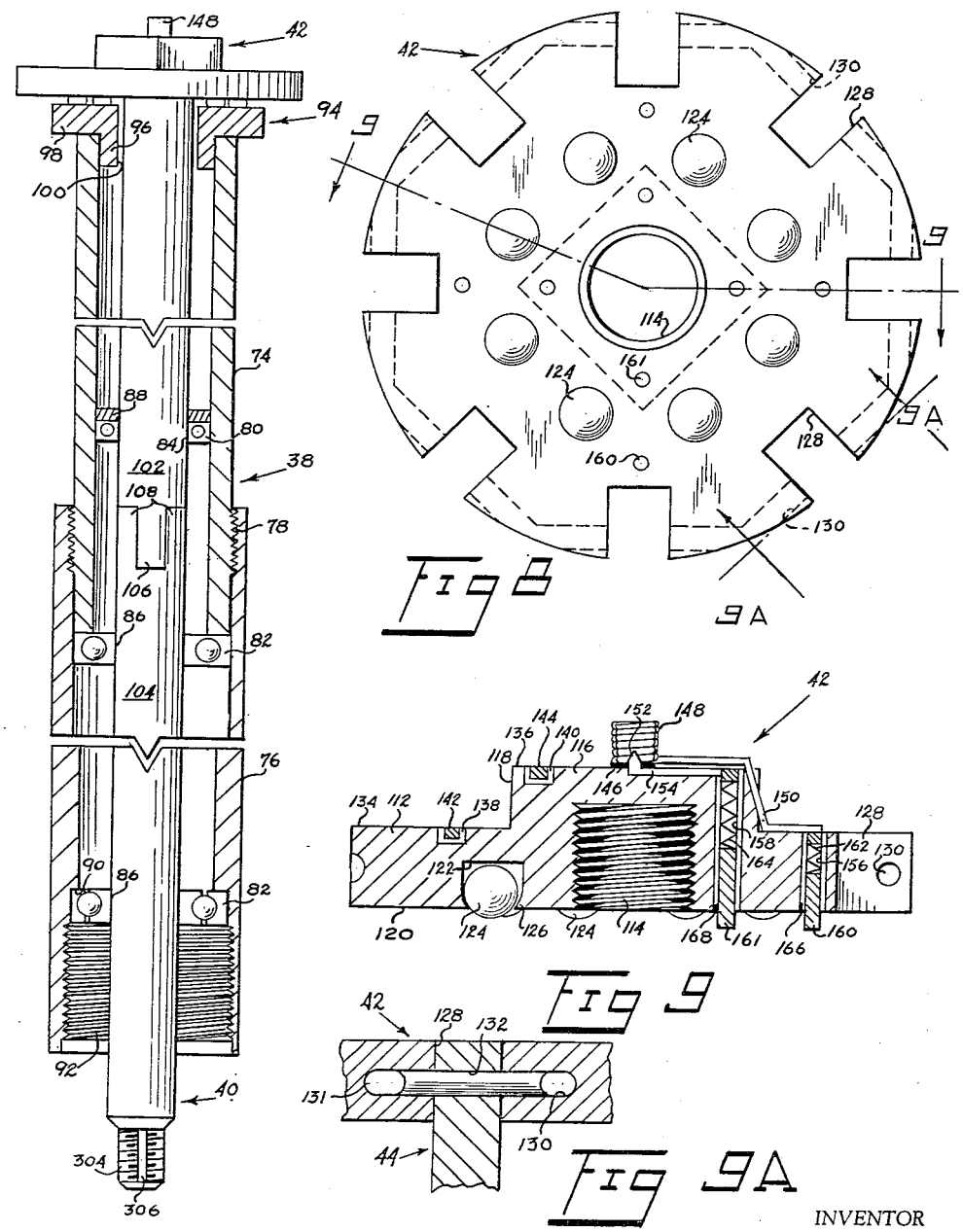

Sept. 17, 1957  G. R. HENRY  2,806,938
ILLUMINATED ROTATING TREE
Filed June 15, 1955  8 Sheets-Sheet 4
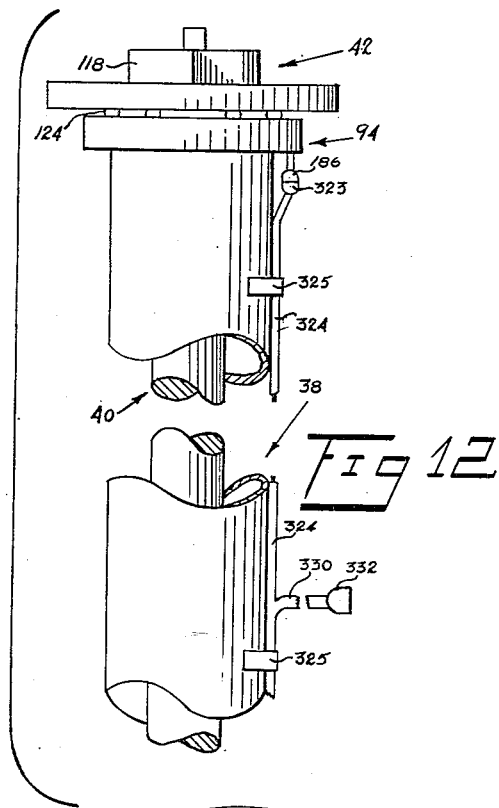
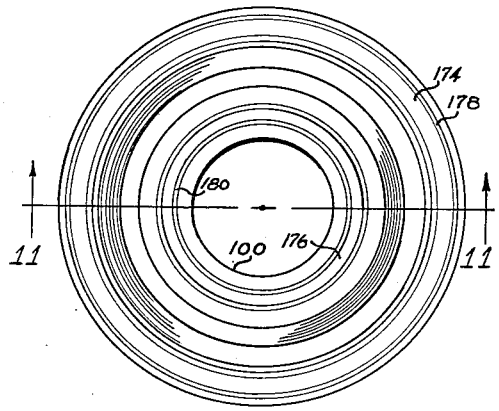
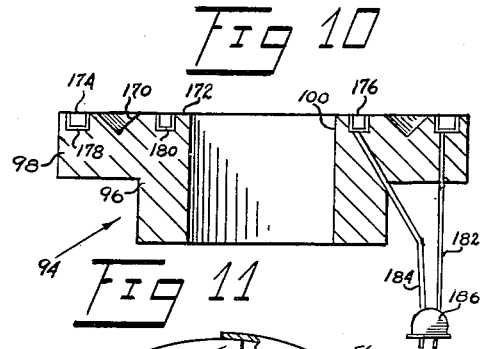
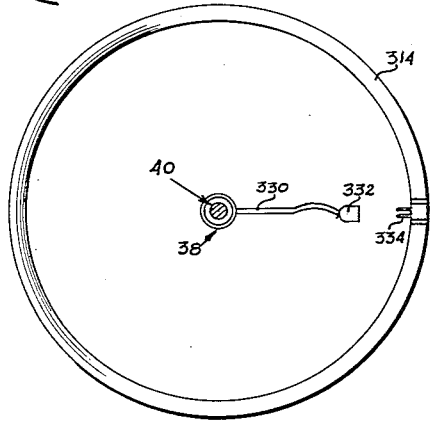
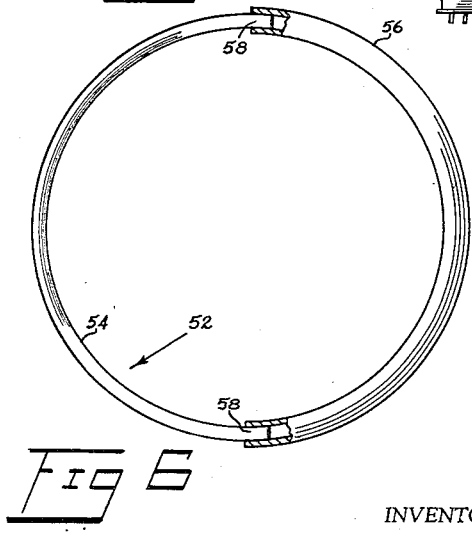
INVENTOR
GRADY R HENRY
BY Robert Cervera
ATTORNEY

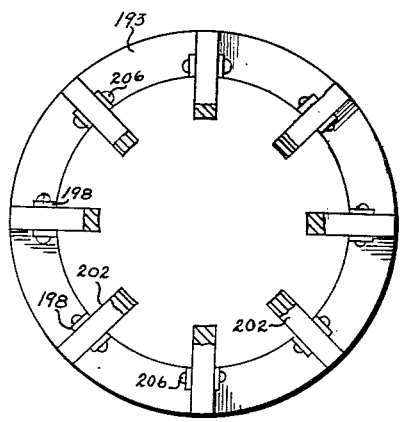
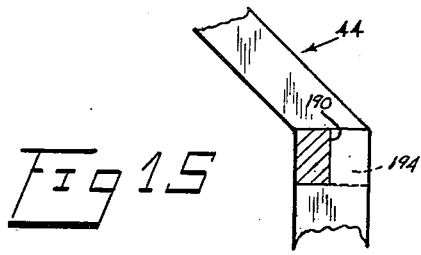
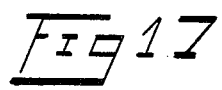
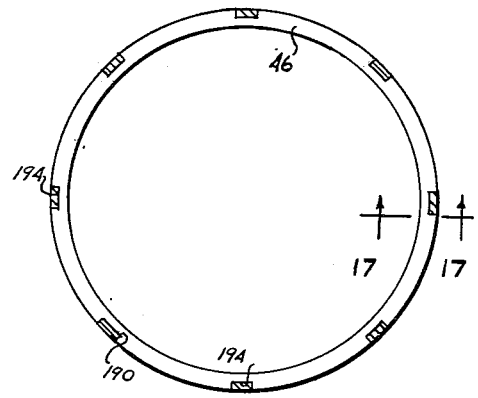
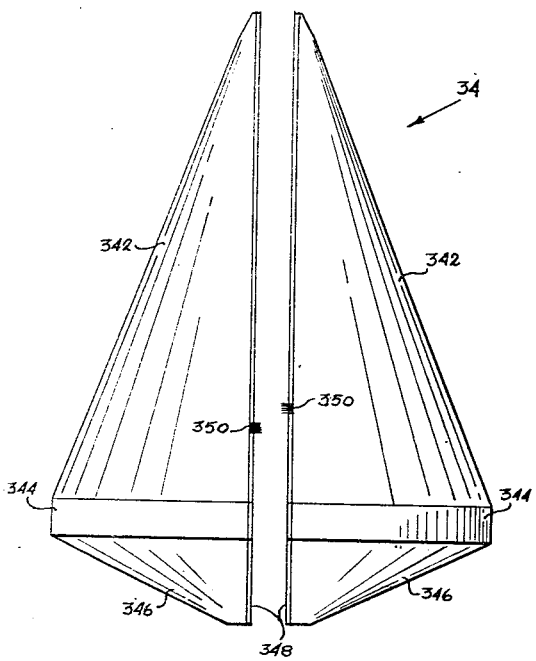
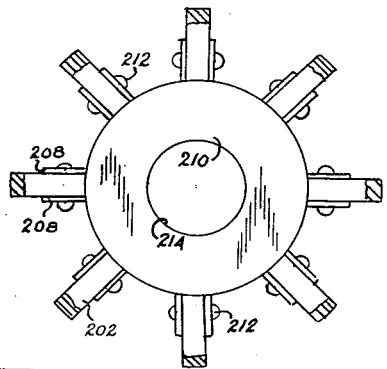
INVENTOR
GRADY R. HENRY Sept. 17, 1957 G. R. HENRY 2,806,938
ILLUMINATED ROTATING TREE
Filed June 15, 1955 8 Sheets-Sheet 6

INVENTOR
GRADY R. HENRY
BY D. Robert Cervera
ATTORNEY

Sept. 17, 1957  G. R. HENRY  2,806,938
ILLUMINATED ROTATING TREE
Filed June 15, 1955  8 Sheets-Sheet 7
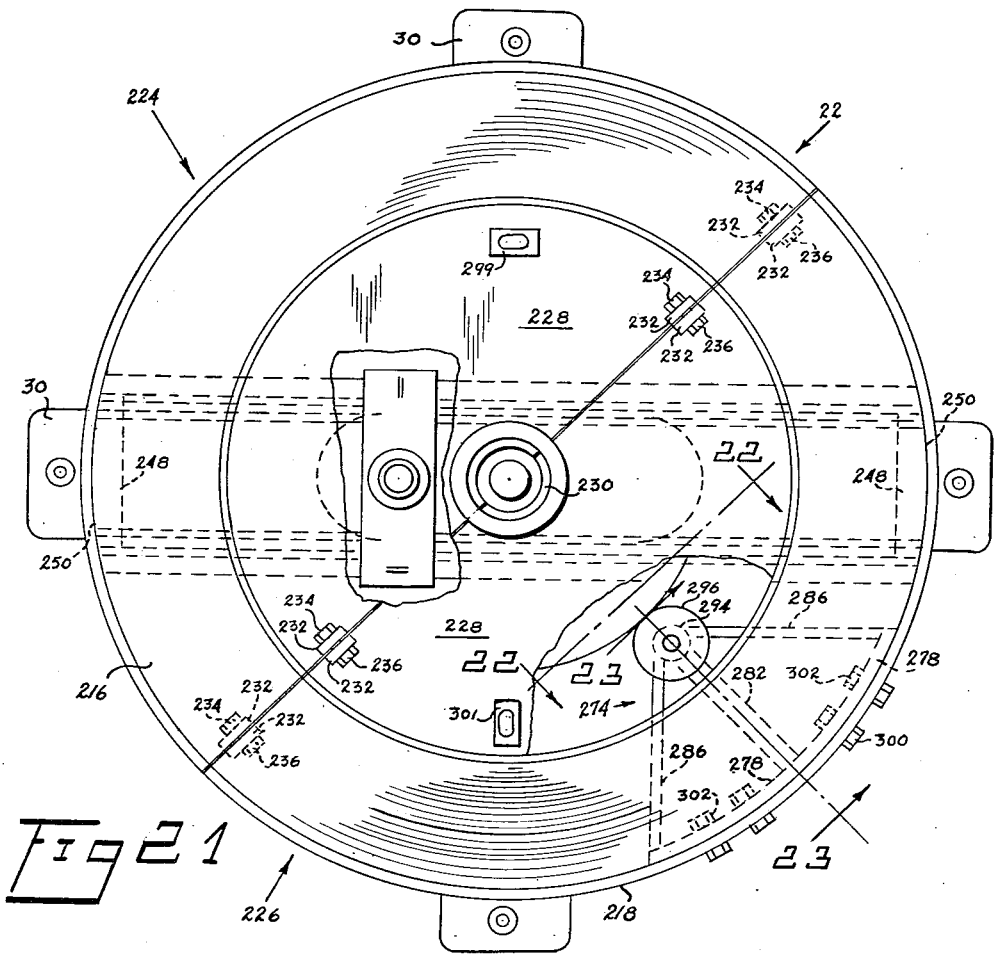
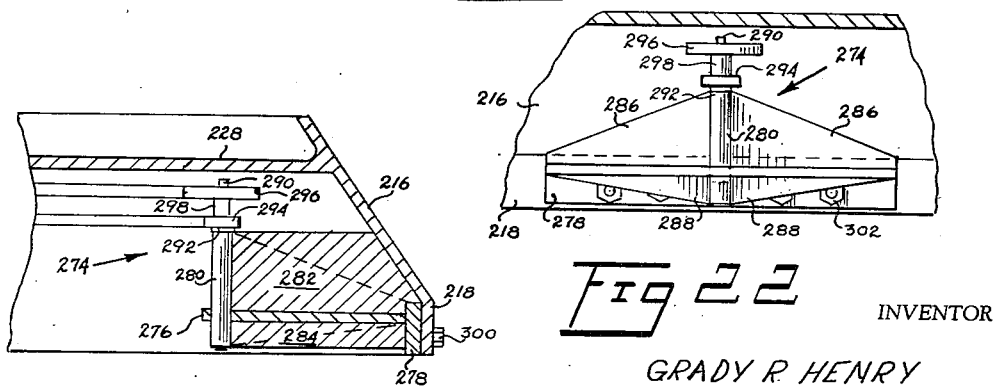
INVENTOR
GRADY R. HENRY
BY D. Robert Cervera
ATTORNEY Sept. 17, 1957 G. R. HENRY 2,806,938
ILLUMINATED ROTATING TREE
Filed June 15, 1955 8 Sheets-Sheet 8

INVENTOR
GRADY R. HENRY
BY D. Robert Cervera
ATTORNEY

United States Patent Office 2,806,938
Patented Sept. 17, 1957

2,806,938

ILLUMINATED ROTATING TREE

Grady R. Henry, Alexandria, Va.

Application June 15, 1955, Serial No. 515,617

13 Claims. (Cl. 240—10.1)

This invention relates to ornamentations and more particularly to synthetic mechanical ornamentations; such as, trees or the like.

The Christmas tree has long been an accepted part, and in fact the focal point of yuletide decorations the world over. Despite the beauty of the well known Christmas tree in the decorative decor of the yule season the presence of this beauty is not without many disadvantages. From early times down to the present time there has occurred, all too often, severe and fatal fires caused by either burning candles or defective wiring which ignite the highly inflammable evergreen tree, most popularly in use. An additional disadvantage in the use of natural trees for decorative purposes is the cleaning problem involved in attempting to completely remove the pine needles which fall from the tree, quite freely, as it is drying. The damage caused by the tree sap which falls on carpets and other furnishings is another definite disadvantage in the use of natural trees for decorations. More often than not it is virtually impossible to purchase a tree of the exact size for the room to be decorated, and as a result the tree has to be cut and trimmed to fit in the desired area with the consequent result that the natural lines and attractiveness of the tree is destroyed.

In recent years the world population has increased exceptionally fast creating a greater market and demand for trees during the Yule season. This ever increasing demand for trees naturally has had and will have an ever increasing adverse effect on our ever depleting natural resources. Since our standing timber is one of our greatest natural resources the constant cutting and consumption of many partially mature trees is a definite waste and will ultimately have serious consequences.

The prior art shows that others have recognized and attempted to alleviate the deficiencies existent in the use of cut natural trees for decorative purposes.

The present invention is directed to a mechanical tree for use as a decorative and educational medium embodying improved details of construction and function over prior devices, which improvements completely overcome the aforedescribed deficiencies in the use of cut natural trees. The novel mechanical tree of the present invention is of unique break-down construction that can be easily assembled, disassembled and compactly stored, which is adapted for many years of use eliminating the repeated yearly purchase of natural trees. Additionally, the tree of the present invention is fireproof and completely safe as well as not having the deficiency of falling pine needles or dripping sap. The novel mechanical tree of the present invention is readily available in various sizes and adaptable for use in either the home or commercial establishments and can be used either indoors or out of doors.

It is therefore a primary object of the present invention to provide novel ornamentation means.

Another object of the present invention is to provide novel mechanical ornamentation means.

A further object of the present invention is to provide novel mechanical illuminated ornamentation means.

Yet another object of the present invention is to provide novel mechanical tree means for aducational and decorative purposes.

An additional object of the present novel invention is to provide a novel illuminated mechanical tree.

Still another object of the present novel invention is to provide a mechanical tree with novel break down construction.

Another object of the present invention is to provide a novel mechanical tree with a unique rotatable frame and novel simulating cover means.

Yet a further object of the present invention is to provide a novel mechanical tree having novel base means.

Still an additional object of the present invention is to provide a novel mechanical tree with novel illuminating means and electrical circuit therefore.

Another object of the present invention is to provide a novel mechanical tree with a novel rotatable framework having an improved simulating cover means circumscribing stationary novel illuminating means and mounted upon a novel easily levelled base means.

Still a further object of the present invention is to provide a novel rotatable mechanical tree with novel drive means for effecting rotation thereof.

Still an additional object of the present invention is to provide a novel mechanical tree with novel means for mounting the tree out of doors.

Yet a further object of the present invention is to provide a novel mechanical rotatable tree that is easily assembled and disassembled and capable of compact storage.

Another object of the present invention is to provide a novel mechanical tree that is completely safe in usage, results in no debris or damage, and which is easily and inexpensively manufactured and easily assembled and disassembled for use in the home or in commercial or educational establishments.

These and other objects will readily appear from the following detailed description and appended claims when read in conjunction with the attached drawings wherein:

Figure 2 is a fragmentary elevational view of the novel frame work, with portions removed for illustrative clarity, and showing the interrelation of the novel rib means and the mounting of the novel illuminating means;

Figure 3 is a fragmentary sectional view showing the interrelation of the novel vertical and horizontal ribs;

Figure 4 is an exploded fragmentary elevational view of the novel hinged joints of the vertical ribs or stringers;

Figure 5 is an exploded side elevational view showing further the novel hinged joint of the vertical ribs or stringers.

Figure 6 is a plan view partially in section of a novel horizontal rib of the novel mechanical tree of the present invention;

Figure 7 is a broken sectional view of the novel centerpole and drive shaft of the present novel invention;

Figure 8 is a bottom plan view of the novel bearing cap plate showing the disposition of the novel bearing means and electrical brush means;

Figure 9 is a sectional view taken substantially along the line 9—9 of Figure 8 showing further details of the novel bearing cap plate;

Figure 9A is a fragmentary sectional view taken substantially along the line 9A—9A of Figure 8;

Figure 10 is a top plan view of the novel bearing support plate of the present novel invention;

Figure 11 is a sectional view taken substantially along the line 11—11 of Figure 10;

Figure 12 is a fragmentary broken elevational view of the present invention showing the mounting of the electrical leads thereon;

Figure 13 is a top plan view of the novel illuminating means looking in the direction of the line 13—13 of Figure 2;

Figure 14 is a sectional view taken substantially along the line 14—14 of Figure 2;

Figure 15 is a sectional view taken substantially along the line 15—15 of Figure 2;

Figure 16 is a sectional view taken substantially along the line 16—16 of Figure 2;

Figure 17 is a fragmentary sectional view taken substantially along the line 17—17 of Figure 16;

Figure 21 is a top plan view partially broken away of the novel base means of the present novel invention;

Figure 22 is a sectional view taken substantially along the line 22—22 of Figure 21;

Figure 23 is a sectional view taken substantially along the line 23—23 of Figure 21;

Figure 24 is an exploded view of the novel cover means of the present novel invention.

Figure 1:
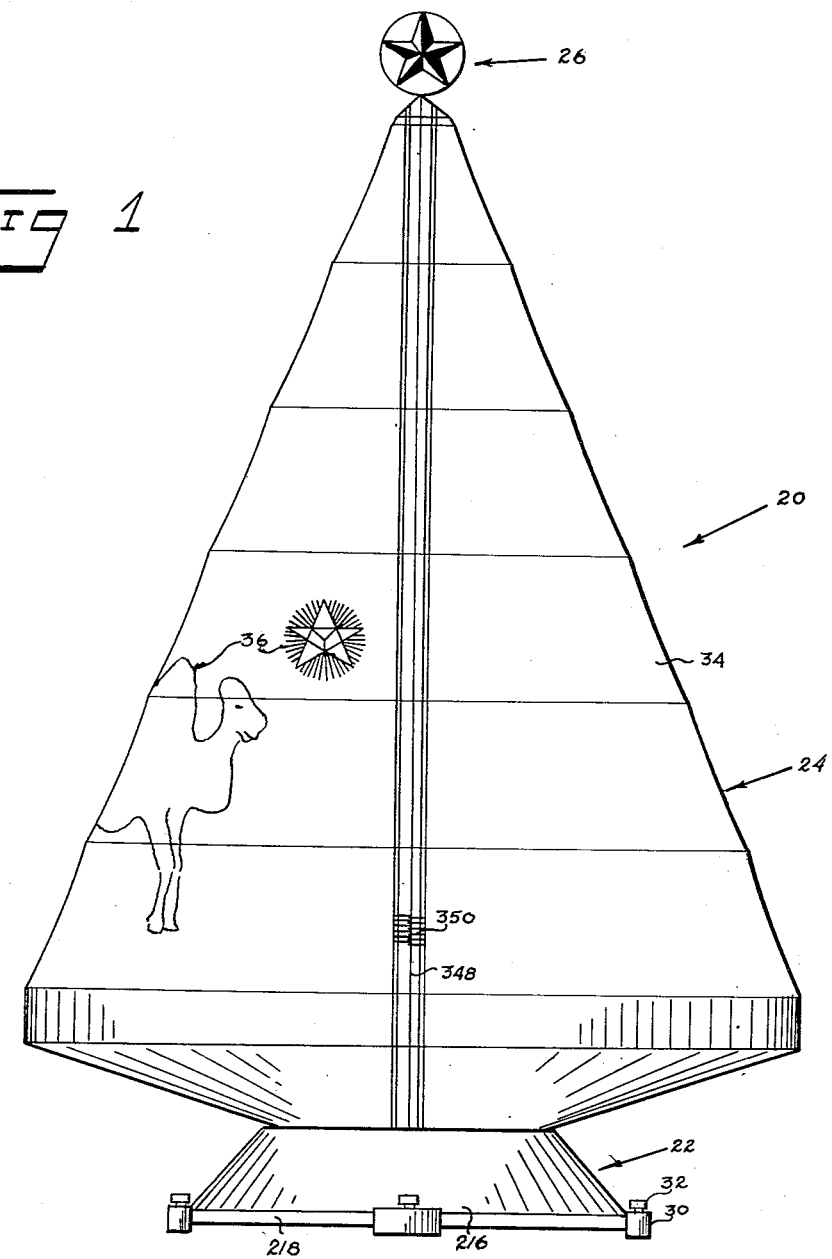
Figure 1 is an elevational view of the novel mechanical tree of the present invention showing, fragmentarily, a decorative motif on the novel cover means, and the novel base means.
Figure 18:
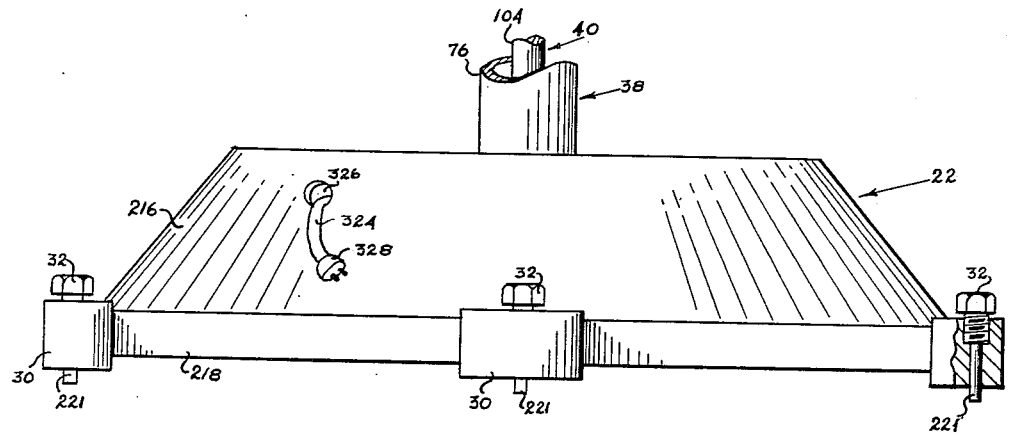
Figure 18 is an elevational view of the novel base means.

Turning now to the drawings and particularly to Figure 1 the numeral 20 generally indicates the novel mechanical rotatable tree of the present novel invention comprising a base generally indicated 22, the conical tree body 24, and a surmounting ornament 26. As clearly seen in Figure 1 base member 22 comprises a truncated conical base portion having four equally spaced legs 30. Levelling bolt 32 is threadedly mounted in and extends through each leg for purposes of levelling novel tree 20, as will be more fully described hereinafter.

Conically shaped body 24 is enclosed by a novel non-flammable cover means 34 bearing a decorative motif thereon, fragmentarily, and generally indicated by numeral 36.

Turning now to Figure 2 the details of the novel framework which makes up the conical body portion 24 will now be particularly described.

As clearly seen in Figure 2 conical body portion 24 is formed around a tubular centerpole 38 in which is rotatably mounted drive shaft 40, to be more fully described hereinafter. Fixedly secured to and rotatable with shaft 40 is a bearing cap plate 42. A plurality of vertical stringers 44, preferably eight in number, are fixedly secured at one end to bearing cap plate 42, to be more fully described, and at the other end to slotted spreader rib 46. The details of bearing cap plate 42 and spreader rib 46 will be more particularly described hereinafter. Vertical stringers 44, which may be formed from wood, plastic or light metals such as aluminum and may be formed either solid or hollow, form the cone shape of tree 20. I prefer to form stringers from tubular aluminum or tubular non-flammable plastics for purposes of safety and lightness.

One one surface of each vertical stringer 44 there are five equally spaced notches defined by vertical sides 48 and horizontal sides 50, as clearly seen in Figure 3. A plurality of circular horizontally disposed ribs 52, in varying diameters, as clearly seen in Figure 2, are mounted over stringers 44 and fit in the notches defined by sides 48 and 50. Vertical stringers 44 generally define the desired conical shape simulating a real tree while the horizontal ribs 52 impart sufficient rigidity to stringers 44 and help to provide support for cover 34, as will hereinafter appear. Ribs 52 can also be formed from wood, plastic, or aluminum, however it is desired to form them from tubular non-flammable materials for the maximum degree of safety and lightness. As clearly seen in Figure 6, each circular rib 52 is preferably formed in two semi-circular portions 54 and 56. The outside diameter of semi circular portion 54 is equal to or slightly less than the inside diameter of semi-circular portion 56. Thus portion 54 is press fittedly mounted in semi-circular portion 56 as clearly indicated at 58 in Figure 6 to form the circular rib 52. The split ring construction of ribs 52 thus permit the size of ribs 52 to be adjusted to assure a tight fit in the notches defined by sides 48 and 50, in addition the split ring construction of ribs 52 facilitate compact non-bulky storage.

To further facilitate storage vertical stringers 44 are provided with at least one hinged joint, generally indicated at 60. The construction of joints 60 is more clearly seen in Figures 4 and 5. One portion of stringer 44 indicated by numeral 62 is formed with a circular bearing portion 64 equal to one half of the thickness of stringer 44 and extending inwardly from one side of portion 62 of stringer 44. The other portion of stringer 44, indicated by numeral 66, is also formed with a circular bearing portion 68 like bearing portion 64, but offset on portion 66 opposite to the disposition of bearing 64 on portion 62. Thus the two bearing portions 64 and 68 will overlap when assembled as can be seen from a reference to Figure 4. Bearing portions 64 and 68 are each provided with axially alignable openings so that a rivet or screw 70 may be mounted in the openings to secure portions 62 and 66 in hinged relation, with bearing faces 72 and 74, respectively, of bearing portions 64 and 66 in bearing contact.

Turning now to Figure 7, there is shown the details of novel centerpole 38 and the mounting of rotatable shaft 40 therein, to be presently described. Centerpole 38, preferably formed of a hollow light weight non-flammable material such as plastic or aluminum, is formed in a plurality of sections; namely the two sections indicated at 71 and 76 in Figure 7. Section 71 has an outside diameter that is approximately equal to the inside diameter of section 76. Adjacent ends of sections 71 and 76 are threaded on their outside and inside diameters, respectively, as indicated at 78, to facilitate easy assembly and disassembly of the sections, as well as permitting compact storage when the novel tree is not in use. A plurality of bearing assemblies 80 and 82 having axially aligned central openings 84 and 86, respectively, are press fittedly mounted in sections 71 and 74, as clearly seen in Figure 7. Bearing 80 is mounted in abutting contact with internal shoulder 88 while one of the bearings 82 abuts the adjacent end of section 71 and the other bearing 82 abuts internal shoulder 90 of section 76. The lower section 76 is internally threaded at its lower end, as indicated at 92, for mounting on base 22 as will hereinafter be described.

Bearing support 94 comprising an axially extending boss 96 integral with and extending from one side of circumferential plate portion 98 is provided with axially extending opening 100. Bearing support 94 is mounted at the upper end of section 71 of centerpole 38 with boss 96 press fittedly engaging the inside diameter of section 71, however if desired both boss 96 and section 71 may either be threaded or provided with alignable apertures to receive a lock pin or the like, to assure the assembly of remaining together while in assembled relation.

Rotatable shaft 40 is press fittedly mounted in openings 84 and 86 of bearings 80 and 82, respectively, and its upper end extends through opening 100 with sufficient clearance to assure non-interfering rotation of shaft 40. The lower end of shaft 40 extends beyond the end of section 76 and is threaded at 304 and is also provided with a key way 306, for a purpose to be more particularly described hereinafter. In order to further facilitate storage of the novel tree of this invention shaft 40 is also constructed in a plurality of easily assembled and disassembled subsections indicated in the drawings as sections 102 and 104, however, it should be emphasized here that the shaft can be constructed in as many sections as desired. As clearly seen in Figure 7 section 102 of shaft 40 is provided with an axially extending tongue 106 at its lower end which drivingly engages the groove in the upper end of section 104 defined by bifurcated portions or arms 108.

The upper end of rotatable shaft 40, as viewed in Figure 7, is threaded to threadedly receive novel bearing cap 42, more clearly shown in Figures 8 and 9 and to be fully described hereinafter. Cap plate 42 comprises a generally circumferential body portion 112 having an axially extending threaded opening 114 extending partially therethrough from one side, for threadedly receiving the threaded upper end of shaft 40. An integral axial boss 116 extends outwardly from the other side of body portion 112 and is provided with wrench flats 118 to permit threaded mounting of cap plate 42 on shaft 40.

The under surface 120 of cap plate 42 is provided with a plurality of circumferentially disposed partial openings 122 for freely rotatably mounting ball bearings 124. Bearings 124 are retained in openings 122 by peening the ends of openings 122, as indicated generally at 126 to form a bearing retention shoulder.

Extending inwardly from the circumference of body portion 112 and equal to the full width of body portion 112 are a plurality of radially disposed equally spaced notches 128 for receiving the upper ends of vertical stringers 44, as will be described. Hinge pin openings 130 extend perpendicularly to notches 128 and also open on the circumference of body portion 112 at opposite ends of openings 130 as clearly seen in Figures 8, 9, and 9A. As best seen in Figure 9A vertical stringers 44 fit in slots or notches 128 and hinge pin 131 press fittedly engages aligned openings 130 and 132 in plate 42 and vertical stringers 44, respectively, to hingedly connect the two together.

A pair of concentric grooves are formed in upper surfaces 134 and 136 of cap plate 42 and serve to mount insulating channels or rings 138 and 140, respectively, which in turn mount electrical contact rings 142 and 144, respectively. It should be noted here that if cap plate 42 is formed from plastic, or other non-conducting material, that insulating rings 138 and 140 will not be necessary. Mounted on the axis of cap plate 42 on surface 136 and insulated therefrom by insulating material 146 is a well known flashlight type threaded bulb shell 148 for threadedly receiving an illuminator ornament 26.

Contact ring 142 is connected to the shell 148 as by electrical lead 150 and contact ring 144 is connected to center terminal 152 of shell 148 as by lead 154 to define an electrical circuit to be more fully described. Equally spaced openings 156 and 158 are provided in plate 42 on the circumference of rings 142 and 144, respectively, and serve to mount electrical contact brushes 160 and 161, respectively, electrically connected to contact rings 142 and 144 as by metallic springs 162 and 164. Brushes 160 and 161 are insulated from cap plate 42 by insulating sleeves 166 and 168, respectively, however, if the cap plate is of non-conducting material then of course sleeves 166 and 168 are unnecessary.

Turning to Figures 10 and 11 in conjunction with Figures 7 through 9 it will be seen that when cap plate 42 is threaded on shaft 40 that bearings 124 will bearingly engage V-sectioned circumferential raceway 170 formed in upper surface 172 of support plate 94. Similarly the upper surface of plate 94 is provided with a pair of concentric grooves having the same circumference as brushes 160 and 161, and which mount contact rings 174 and 176 which bearingly engage adjacent ends of brushes 160 and 161, respectively, to form an electrical flow path, which will be described. Contact rings 174 and 176 are insulated from support plate 94 as by insulating channels 178 and 180, and are also connected to electrical leads 182 and 184, respectively, for a purpose to be more particularly described hereinafter. The ends of leads 182 and 184 are connected to a well known male type electrical plug 186, as clearly seen in Figure 11.

Turning now to Figures 14 through 16 in conjunction with Figure 2 the details of assembly of the lower portion of stringers 44 will now be described. As clearly seen in Figure 2, the lower end of stringers 44 are provided with vertically depending integral portions 188 having notches 190 at its upper ends. Spreader rib 46 is of generally circular construction, formed as two detachable semi-circular portions for storage purposes as previously described, and is provided on its outer circumference with a plurality of equally spaced notches 194. In assembly spreader rib 46 is mounted within the circumference defined by stringers 44 so that notched portions 188 of the stringers engage the notched portions of spreader rib 46 to effectively lock the two together, as clearly seen in Figure 16.

Support rib 193 is also circular and formed by two detachable semicircular portions, having integral equally spaced upwardly extending tongue portions 196 at its outer circumference and concentrically disposed downwardly extending bifurcated portions 198. Tongue portions 196 receive the lower ends of stringer portions 188 therebetween and are hingedly connected together as by pins 200, passing through aligned openings in tongues 196 and portions 188. Oblique ribs 202 having a triangularly shaped integral gusset section 204 at one end for bearing contact with the underside of support rib 193 are mounted between bifurcated portions 198 and secured thereto by pins 206. The other ends of oblique ribs 202 are mounted between integral equally spaced bifurcated arms 208 of bottom rib 210 and pinned thereto as by pins 212. Bottom rib 210 is provided with axial opening 214 to allow centerpole to extend therethrough in non-interfering relation.

It should be noted here that all stringers 44 and ribs are preferably constructed of light weight non-flammable material such as plastics or aluminum, and that all circular members are preferably of semi-circular easily assembled construction which permit compact storage.

Turning now to Figures 18 through 23 the details of novel base member 22 and its novel connection to rotatable shaft 40 will now be particularly described. Base member 22, preferably formed from aluminum, comprises a generally truncated cone-shaped body 216 having an open upper end 217 surmounting a cylindrical lower portion 218. Legs 30 equally spaced about the periphery of cylindrical portion 218 and fixedly secured thereto as by bolts or welding are provided with concentric axially aligned through openings 220 and 222. The openings 220 are threaded for receiving threaded levelling screws 32, which have a non-threaded portion 221 extending through openings 222 and engaging the surface upon which the novel tree is to be mounted. Screw 32 can be adjusted individually to effect levelling of the tree, which will be more particularly described hereinafter.

As clearly seen in Figure 21, and in order to facilitate compact storage, base member 22 is constructed in two halves indicated generally by numerals 224 and 226. Each half of base member 22 is provided with a platform portion half 228 spaced below the top of portion 216 and having at their centers a hollow semi-circular boss portion 230 having threads on their outer peripheries and adapted to form a cylindrical boss portion when assembled, as will appear. On the platform portion 228 of each half of base member 22 there is provided four upstanding lug assemblies 232 formed integrally with platform portion 228, or welded thereto. Lugs 232 are provided with axially aligned openings for receiving securing nuts and bolts 234 and 236, respectively. Beneath platform 228 and on the inner wall of truncated portion 216 of each half of base member 22 there is provided lugs 238 which like lugs 232 receive securing nuts and bolts (not shown) for fixedly securing the halves of body portions 22 together. When halves 224 and 226 are fixedly secured together semi-circular boss portions 230 form an externally threaded tubular body for threadedly receiving the adjacent internally threaded end of centerpole 38, as clearly seen in Figure 19. As also clearly seen in Figure 19 the end of boss portion 230 abuts the inner race of bearing 82 to further aid in maintaining bearing 82 in its desired position.

Mounted beneath platform 228 is an adjustable motor assembly, generally indicated at 240, to now be described. Motor assembly 240 comprises a pair of I beam sectioned members 242 fixedly connected in spaced relation by coextensive channel member 244 fixedly connected to the inner faces of the webs of I beam members 242, as by bolts, welding or the like, as clearly seen in Figure 20. The upper surface of channel member 244 is provided with an opening 246. Across the opposite ends of I beam members 242 there is fixedly secured a pair of mounting lugs or members 248 having curved outer peripheries 250 to conform to the curved inner surface of cylindrical portion 218 of base member 22. The I beam members 242 and channel member 244 forming a subassembly are fixedly secured to base member 22 by bolts 252 passing through openings in mountings 248 and engaging aligned threaded openings in a pair of opposite legs 30, as clearly seen in Figure 19.

Figure 20:
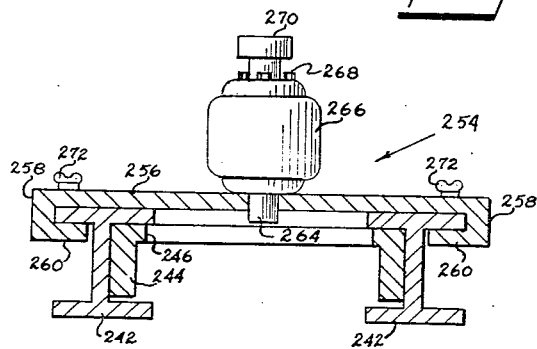
Figure 20 is a sectional view taken substantially along the line 20—20 of Figure 19.

Mounted and slidable on the upper surface of I beam members 242 is a motor mounting platform 254 comprising a flat plate portion 256 having integral depending legs 258 and inwardly bent flanges 260 which slidably engage the outer most flange portions of I beam members 242, as clearly seen in Figure 20, to facilitate slidable adjustment thereon. Plate portion 256 is provided with a central opening 262 for permitting shaft 264 of motor 266 to extend therethrough, when motor 266 is mounted on plate portion 256 in a vertical position. Mounting bolts 268 extend through motor 266 and plate 256 to fixedly secure motor 266 in its desired assembled relation. The upper end of motor shaft 264 drivingly mounts a small pulley 270 secured thereto by well known means. Wing bolts 272 threadedly mounted in plate portion 256 can be tightened to engage the upper surface of I beam members 242 to maintain motor 266 and plate portion 256 in the desired adjusted position.

Countershaft assembly generally indicated 274 and clearly seen in Figures 21 through 23 is mounted at the midpoint of the inner periphery of base half 226 will now be particularly described.

Countershaft assembly 274 comprises a generally triangular base plate 276 having a curved periphery fixedly secured, as by welding, to curved mounting plate 278 equal in height to cylindrical portion 218 of base member 22. Hollow shaft tube 280 is fixedly secured at the apex of base plate 276 as by welding, and is disposed in a perpendicular relation thereto. Upper and lower central webs 282 and 284, respectively, extend from hollow shaft tube 280 to mounting plate 278 and are disposed in essentially perpendicular relation thereto, and are fixedly secured thereto as by welding. Upper and lower triangular webs 286 and 288, respectively, are similarly welded to the aforedescribed base plate and mounting plate and extend radially from hollow tube 280 to the ends of mounting plate 278, as clearly seen in Figures 21 and 22.

Rotatable shaft 290 is rotatably mounted in hollow tube 280 and has one side of integral shoulder 292 bearingly engaging the upper end of tube 280 to prevent shaft 290 from passing completely through tube 280. Drivingly mounted on shaft 290 and abuttingly engaging the other side of integral shoulder 292 is a small pulley 294 for a purpose to appear. A second larger pulley 296 is also drivingly mounted on shaft 290 and is maintained in spaced relation to pulley 294 by intermediately disposed sleeve 298. A plurality of bolts 300 passing through aligned openings in cylindrical portion 218 of base member 22 and mounting plate 278 and threadedly mounting nuts 302 fixedly secure countershaft assembly 274 to base member 22 in the position shown in Figure 21. And, of course, the detachable construction of countershaft assembly 274 also allows for compact storage upon disassembly.

Spirit levels 299 and 301 are mounted upon the upper surface of platform 228 and serve to indicate when base member 22 and consequently tree 20 are level. As clearly seen in Figure 21, level 299 is disposed essentially parallel to I beam members 242 while level 301 is disposed essentially perpendicular thereto. In this manner the levelness of base member is truly indicated and can be easily adjusted by screws 32.

Figure 19:
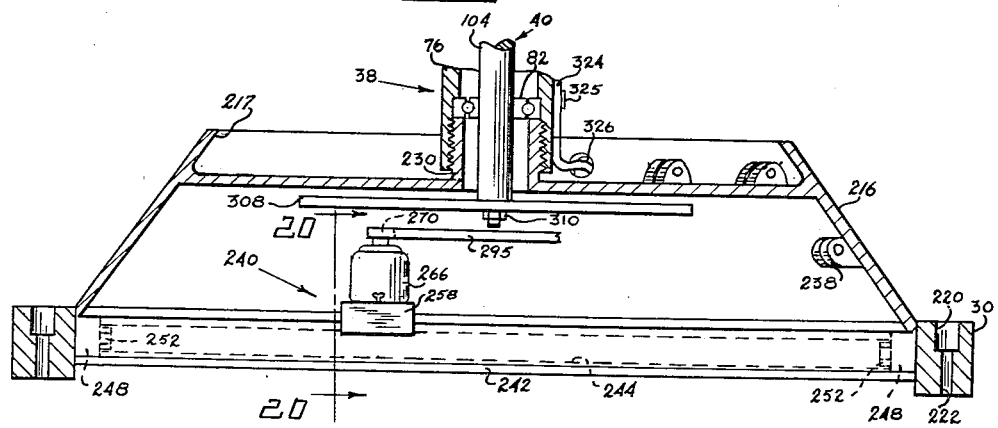
Figure 19 is a vertical sectional view of the novel base means showing the details thereof.

Turning now to Figure 7 in conjunction with Figure 19 it will be seen that the lower end of rotatable shaft 40 is provided with an integral externally threaded barrel portion 304 having a keyway 306 formed thereon. Large pulley 308 is mounted and drivingly keyed on barrel portion 304, as clearly seen in Figure 19 and is retained thereon by nut 310.

Pulley 270 is drivingly connected to pulley 294 by means of drive belt 295 while pulleys 296 and 308, whose peripheries are provided with a roughened frictional surface, mutually engage, for purposes which will appear.

The novel mechanical tree of this invention is provided with electric illumination, as partially described heretofore, the means of directing the electrical current to the illuminating means will now be particularly described.

As clearly seen in Figure 2 there is shown a plurality of circular fluoresent type light bulbs 312, 314, and 316 of varying diametrical sizes, mounted within the cone defined by vertical stringers 44. Fixedly secured to centerpole 38 as by welding are three groups of circumferentially spaced hook members 318 to which one end of support wires 320 are fixedly connected. The other ends of wires 320 are formed with hooked ends 322 which snugly fit about the curved surfaces of lights 312, 314, and 316, as clearly seen in Figure 2, to support the lights in the their desired assembled position.

Wire lead 324 is mounted on the outer periphery of centerpole 38 as by means of clips 325 welded to the outer periphery of centerpole 38. The upper end of lead 324 is provided with a female type plug 323 for electrical connection to male plug 186, while the lower end of lead 324 which extends through opening 326 of base member 22 is provided with a male plug 328 for connection to the standard 110 volt household outlet, or to an extension cord, which is in turn connected to the aforementioned outlet. Jumper leads 30 are tapped off lead 324 at spaced intervals and are provided at their outer ends with female type plugs 332 for electrical connection to prongs 34 on lights 312, 314, and 316, as clearly illustrated in Figure 13.

Light bulb type electrical ornament 26, shown in Figure 1, is threadedly mounted in bulb shell 148 illustrated clearly in Figure 9. Electrical current is conducted to ornament 26 through contact rings 178 and 180, brushes 160 and 161, rings 142 and 144, and leads 150 and 154.

It should be brought out here that if it is not desired to have an electrical type ornament 26 that the construction of tree 20 can be much simplified by the elimination of contact rings 178, 180; 142 and 144; and brushes 160 and 161 and associated elements.

Turning now to Figure 24 there is shown the details of novel cover means generally indicated at 34, which covers the structure of tree 20 and aids in simulating a natural tree. Cover 34 is preferably formed of a non-flammable partially transparent plastic material bearing colored symbols; such as, Christmas symbols, on its outer surface as fragmentarily illustrated by the numeral 36 on Figure 1. Cover means 34 comprises a generally conical portion 342 conforming to the conical configuration defined by stringers 44. At the base conical portion 342 is provided with a cylindrical portion 344 conforming to cylindrical portion at the base of stringers 44, while beneath cylindrical portion 344 is a generally inverted cone portion 346 conforming to the shape defined by ribs 202. Cover 34 is formed in two separate pieces, as seen in Figure 24, for easy assembly on tree 20, and is provided along adjacent edges 348 with zipper members 350 for easy connection of the two halves once they are properly fitted on tree 20. It can be readily appreciated from the foregoing description and the drawings that cover 34 fits snugly over the framework of tree 20 and completely encloses the tree so that when tree 20 is used out of doors the wind can not get within cover 34 and tear it from the framework of the tree.

Figure 25:
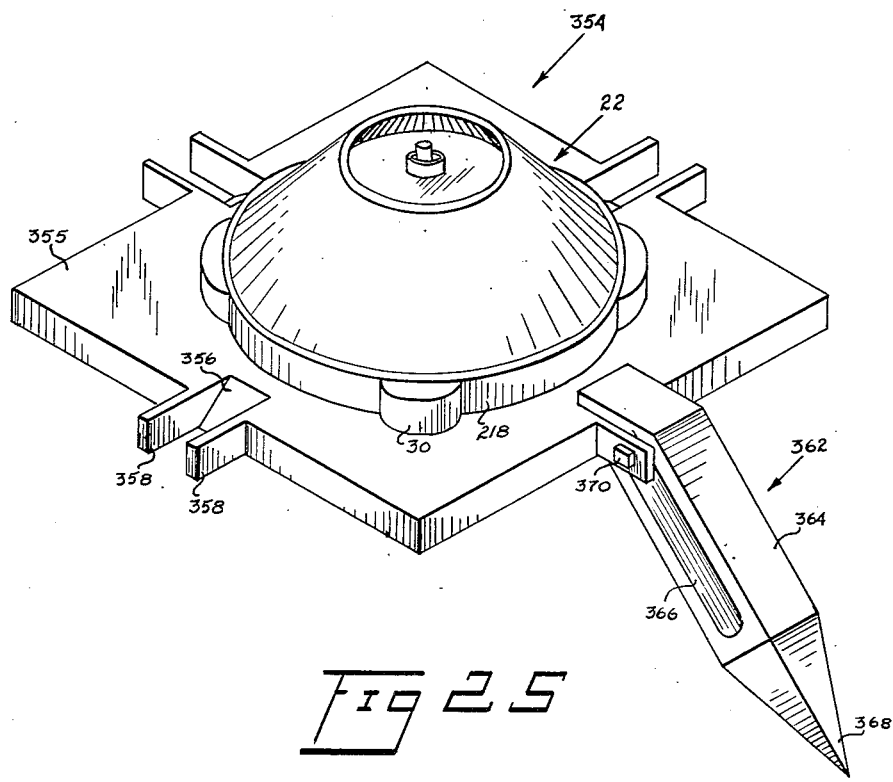
Figure 25 is a fragmentary perspective view of the novel mounting means for mounting the novel mechanical tree of the present invention out of doors.

Turning now to Figure 25 there is shown a novel platform for mounting tree 20 out of doors, which will now be particularly described.

Generally indicated by the numeral 354 is a stand preferably formed of treated weather resistant wood or aluminum. Equally spaced along opposite marginal edges of platform surface 355 of stand 354 there are formed angular cuts or notches 356, and spaced from each other the width of notches 356 are a pair of ears 358, integrally formed or bolted to stand 354 axially aligned openings 360 therethrough. Mountable between each pair of ears 358 is an anchor peg 362, preferably formed from aluminum. Peg 362 comprises a body portion 364 having a slot 366 therethrough and a sharply pointed end 368. Anchor peg 362 is retained between ears 358 by bolt 370. Pegs 362 are driven into the ground while bolts 370 are loose then the bolts are tightened and a rough levelling of stand 354 is effected. The tree 20 is then mounted on stand 354, only the base member 22 being shown in Figure 25. A modification of screws 32, having threaded ends which engage threaded openings (not shown) in platform 355 so that once tree 20 is mounted on the platform bolts 370 can be loosened and accurate levelling of the tree can be effected by observing the adjustment of pegs 362 on levels 299 and 301.

In operation, a lead from motor 266 (not shown) is plugged into a source of electricity. Rotation of shaft 264 of motor 266 causes pulley to rotate which rotation is imparted to pulley 294 by means of belt 295. Rotation of pulley 294 is imparted to pulley 296 through shaft 290 whose rotation is then imparted to pulley 308 by virtue of the fractional driving contact therebetween. Since pulley 308 is drivingly keyed to shaft 40 rotation of pulley 308 will be imparted thereto which will in turn be imparted to bearing cap plate 42. Stringers 44 and their associated horizontal ribs will be of course be caused to rotate by virtue of the connection of stringers 44 to cap plate 42 as seen in Figure 9A, and heretofore described. As a result the entire framework of tree 20 will be caused to rotate causing a constantly moving panorama of illustrations 36 to be exhibited. Lights 312, 314, and 316 which remain stationary by virtue of their supporting mounting on centerpole 38 will enhance tree 20 by creating a soft background light for illustrations 36. The novel tree of the present invention can employ various cover designs, incorporating bedtime stories, and other educational or amusing characters for both the enjoyment and education of young and old alike.

It will readily be appreciated from the foregoing that there is disclosed herein a novel tree that is of unique construction and function, that is absolutely safe and alleviates the worries of hazards heretofore existent in the use of natural cut trees, that is clean and eliminates the damage resulting from the use of natural cut trees, and which can be easily stored and used year after year thereby materially lessening the cost of Yule decorations. In addition the novel tree of the present invention is constructed of inexpensively easily assembled and disassembled elements for maximum convenience of use.

The invention may be embodied in other forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a synthetic mechanical tree, a stationary base member; a hollow stationary centerpole mounted on and extending vertically above said base member; a shaft rotatably mounted in said centerpole; power means mounted in said base member operatively connected to said shaft for effecting rotation thereof; a plurality of substantially vertically disposed elongate members removably drivably connected at one end to said shaft for rotation therewith; an enlarged circular rib removably connected to the other end of said elongate members to form said elongate members into a substantially conically-shaped framework; a plurality of notches on an outer side of said elongate members; a plurality of horizontally disposed and spaced braces encircling said elongate members supported in said notches to further define said framework and impart rigidity thereto; illuminating means supported on said centerpole within said framework; electrical leads mounted on said centerpole operatively connected to said illuminating means and attachable to a source of electrical power for energizing said illuminating means; and translucent cover means removably mounted on and completely enclosing said framework to simulate a real tree for ornamentation purposes.

2. In a synthetic mechanical tree, a stationary base member; a platform in said base member having an externally threaded boss thereon; a hollow stationary centerpole threadably mounted on said boss and extending vertically above said base member; a hollow support member mounted at the upper end of said centerpole having a bearing race in an exposed surface thereof; a shaft rotatably mounted in said centerpole; power means mounted in said base member and drivingly connected to said shaft for effecting rotation thereof; a cap plate fixedly connected to the upper end of said shaft for rotation therewith; bearings non-removably rotatably mounted in said cap plate bearingly engaging said bearing race; a plurality of elongate members hingedly connected to their upper ends to said cap plate; a plurality of horizontally disposed and spaced ribs operatively connected to said elongate members to define therewith a conically shaped framework rotatable with said shaft; illuminating means mounted on said centerpole and cap plate; and semi-transparent cover means removably mounted on and completely enclosing said framework to simulate a real tree for ornamentation purposes.

3. The device as set forth in claim 2 wherein said cap plate is provided with a plurality of circumferential notches in which said elongate members are hingedly pinned.

4. The device as set forth in claim 2 wherein said illuminating means mounted on said centerpole comprise a plurality of different diameter fluorescent bulbs, and said illuminating means on said cap plate comprises an illuminable ornament.

5. The device as set forth in claim 4 wherein electrical leads are mounted on said centerpole for connection to said bulbs, and rotatable electrical contact means are mounted in said support member and cap plate and connected to said electrical leads, whereby said bulbs and illuminable ornament will be energized when said leads are connected to a source of electrical power.

6. In a collapsible synthetic mechanical tree, a base member; a shaft rotatably mounted on and extending vertically above said base member; interconnected separable rib elements defining a collapsible conical framework mounted on and rotatable with said shaft; stationary means mounted on said base member within said framework; stationary illuminating means supported by said stationary means; electrical leads mounted on said stationary means and connected to said illuminating means, whereby electrical energy is transmitted to said illuminating means; semi-transparent removably mounted decorative cover means completely enclosing said conical framework and simulating the conical shape of a real tree; and drive means in said base member drivably connected to said shaft, whereby said shaft and framework are rotated about said stationary illuminating means to display the full decorative effect of said cover means.

7. In a collapsible synthetic mechanical tree, a stationary base member; a separable sectioned shaft rotatably mounted on and extending vertically above said base member; a plurality of interconnected jointed and separable rib elements defining collapsible conical framework mounted on and rotatable with said shaft; a stationary sectioned tubular member mounted on said base member in concentric relation with said shaft; stationary illuminating means supported by said stationary tubular member; semi-transparent removably mounted decorative cover means completely enclosing said conical framework and simulating the conical shape of a real tree; and drive means in said base member drivably connected to said shaft, whereby said shaft and framework are rotated about said stationary illuminating means to display the full decorative effect of said cover means; said tree being totally collapsible, when not in use, for compact packaging and storage.

8. In a collapsible synthetic mechanical tree, a sectional stationary base member; a separable sectioned shaft rotatably mounted on and extending vertically above said base member; a plurality of elongate hinged members connected at one end to the upper end of said shaft and rotatable therewith; an enlarged circular member disposed adjacent the lower end of said shaft and connected to the other ends of said hinged members, whereby said hinged members define a generally conical tree-like shape; separable circumferential ribs mounted on said hinged members to impart structural rigidity thereto; a stationary sectioned tubular member mounted on said base member in concentric relation with said shaft; stationary circumferential illuminating means mounted on said tubular member; semi-transparent decorative cover means completely enclosing said hinged members and circumferential ribs; drive means removably mounted in said base member and drivably connected to said shaft, whereby said shaft and hinged members are rotated about said circumferential illuminating means to display the full decorative effect of said cover means; said tree being totally collapsible, when not in use, for compact packaging and storage.

9. In a collapsible synthetic mechanical tree, a separable base member; a separable sectioned shaft rotatably mounted on and extending vertically above said base member; a plurality of elongate hinged members connected at one end to said shaft and rotatable therewith; an enlarged circular member adjacent the other end of said shaft and connected to the other ends of said hinged members; a plurality of interconnected downwardly converging struts connected to the underside of said circular member, whereby said hinged members and struts define an essentially base to base mounted conical framework; a plurality of separable circumferential ribs mounted on said hinged members imparting structural rigidity thereto; a stationary tubular member mounted on said base member in concentric relation with said shaft; stationary illuminating means mounted on said tubular member; drive means on said base member drivably connected to said shaft, whereby said shaft and framework rotate about said stationary illuminating means; and semi-transparent cover halves removably secured together and conforming exactly to the shape of said framework, completely encircling said framework to protect said illuminating means and present a decorative effect for said tree.

10. The device as set forth in claim 9 wherein said hinged members are provided with a plurality of notches on an outer surface thereof; and said circumferential ribs comprise pairs of adjustably telescoping semi-circular members adjustably mounted in said notches.

11. The device as set forth in claim 9 wherein adjustable means are mounted on said base member for levelling said tree and preventing eccentric rotation thereof; and levelling devices on said base member indicating when said tree is level.

12. The device as set forth in claim 9 wherein said base member is removably mounted on a stand member, for outdoor display; a plurality of pointed legs adjustably mounted on said stand member, which can be easily driven into the ground.

13. In a collapsible synthetic mechanical tree, a separable base member; a separable sectioned shaft rotatably mounted on and extending above said base member; a stationary separable sectioned tubular member mounted on said base member in concentric surrounding relation to said shaft; a separable framework of essentially base to base mounted conical configuration mounted on and rotatable with said shaft; circumferential tubular illuminating means mounted on said tubular member within said framework; electrical leads on said tubular member connected to said illuminating means and connectable to a source of electrical energy for energizing said illuminating means; an illuminable device mounted on the upper end of said shaft; means on said shaft and tubular member connected to said illuminable device and electrical leads, respectively, whereby electrical energy is transmitted from the stationary electrical leads to the rotatable illuminable device; drive means on said base member drivably connected to said shaft; and separable semi-transparent decorative cover means conforming to the shape of said framework completely enclosing said framework to protect said illuminating means and to present a constantly moving decorative effect as the framework is rotated.

References Cited in the file of this patent

UNITED STATES PATENTS

| | | |
|---|---|---|
| 735,010 | Zahl | July 28, 1903 |
| 1,252,922 | Miller | Jan. 8, 1918 |
| 1,527,596 | MacCartney | Feb. 24, 1925 |
| 1,764,540 | Vydra | June 17, 1930 |
| 2,171,116 | Muldoon | Aug. 29, 1939 |
| 2,201,093 | Illo | May 14, 1940 |
| 2,279,182 | Snyder | Apr. 7, 1942 |
| 2,485,460 | Rocca | Oct. 18, 1949 |
| 2,586,791 | Dattilo | Feb. 26, 1952 |